United States Patent
El-Hoiydi et al.

(10) Patent No.: US 11,206,055 B2
(45) Date of Patent: Dec. 21, 2021

(54) AUDIO STREAM DETECTION

(71) Applicant: Sonova AG, Staefa (CH)

(72) Inventors: Amre El-Hoiydi, Neuchâtel (CH); Michael Bernhard, Evilar (CH)

(73) Assignee: Sonova AG, Staefa (CH)

(*) Notice: Subject to any disclaimer, the term of this patent is extended or adjusted under 35 U.S.C. 154(b) by 0 days.

(21) Appl. No.: 16/638,655

(22) PCT Filed: Aug. 14, 2017

(86) PCT No.: PCT/EP2017/070571
§ 371 (c)(1),
(2) Date: Feb. 12, 2020

(87) PCT Pub. No.: WO2019/034227
PCT Pub. Date: Feb. 21, 2019

(65) Prior Publication Data
US 2021/0135704 A1 May 6, 2021

(51) Int. Cl.
H04B 1/7156 (2011.01)
H04L 29/06 (2006.01)
H04R 25/00 (2006.01)

(52) U.S. Cl.
CPC ....... H04B 1/7156 (2013.01); H04L 65/4069 (2013.01); H04R 25/554 (2013.01)

(58) Field of Classification Search
USPC ............. 381/23.1, 74, 77, 98, 309, 312, 315
See application file for complete search history.

(56) References Cited

U.S. PATENT DOCUMENTS 8,194,902 B2 6/2012 Pedersen
9,265,080 B1* 2/2016 Palin .................... H04W 8/005
2010/0166209 A1 7/2010 Dunn
2012/0310394 A1 12/2012 El-Hoiydi
2017/0251469 A1* 8/2017 Lee ........................ H04L 1/16

FOREIGN PATENT DOCUMENTS

WO 2004110099 12/2004
WO 2011098141 8/2011
WO 2019034227 2/2019

OTHER PUBLICATIONS

International Search Report and Written Opinion received in International Application No. PCT/US17/070571, dated May 4, 2018.

* cited by examiner

Primary Examiner — Yosef K Laekemariam
(74) Attorney, Agent, or Firm — ALG Intellectual Property, LLC

(57) ABSTRACT

There is provided an audio transmission method, comprising: wirelessly connecting an audio receiver device to a first audio streaming device; transmitting a first audio stream from the first audio streaming device using a first protocol to the audio receiver device, wherein at least one audio data packet is transmitted in each frame in at least one audio packet slot; and scanning, by the audio receiver device, while receiving the first audio stream from the first audio streaming device, during at least one scan window (S) for frequency hopping synchronization (FHS) packets (F) transmitted from a second audio streaming device in a second audio stream using a second protocol. The scanning activity enables reception of at least one audio packet per frame of the first audio stream by preventing collision of the at least one scan window with at least one audio packet slot (A) per frame (R).

20 Claims, 7 Drawing Sheets

AUDIO STREAM DETECTION

The disclosure relates to a wireless audio receiver device and a wireless audio transmission method.

Isochronous audio stream transmission between audio devices often employs frequency hopping techniques wherein the transmission frequency is changed according to a certain frequency hopping sequence. In such systems, a master device typically transmits regularly frequency hopping synchronization (hereinafter referred to as "FHS") packets on a small set of frequencies to help a slave device to connect to the frequency hopping sequence. Thus, to be able to connect to the frequency hopping sequence used by the master device a slave device has to successfully receive at least one such FHS packet. However, since the slave device during scanning for such FHS packet is not yet synchronized to the master device transmitting FHS packets, the scanning slave device does not know when and at which frequency transmission of a FHS packet will occur.

Typically, FHS packets are transmitted periodically. A known technique for listening to synchronization packets is the so-called "sliding scan" technique, wherein the scanning device listens periodically during a scan window on the frequency on which synchronization packets are to be expected, wherein the period length (or periodicity) of the scan windows is selected so as to be different from a multiple of the synchronization packet transmission period length, thereby causing a relative shift between the scan window and the synchronization packet transmission at each sequential scan period, so that after some time a scan window and a synchronization packet transmission will meet in time and frequency at a certain point in time. The required maximum time interval for synchronization is also called "latency". In other words, irrespective of the initial phase difference between the scan windows and the synchronization packets there will always be a meeting in time and frequency after the maximum time interval has lapsed. Typically, the period length of the scan windows is longer than the period length of the synchronization packets.

U.S. Pat. No. 8,194,902 B2 relates to an example of a sliding scan technique, wherein a hearing instrument synchronizes with the transmitter of a device in a wireless network by adjusting a sum of an activated time period and a de-activated time period to be different from a duration of the network protocol frame, so that the specific time slot for the transmission of data by the transmitter and the activated time period will overlap at one time.

WO 2011/098141 A1 relates to another example of a sliding scan technique, wherein a receiver unit of a hearing instrument synchronizes with a transmission unit of an audio signal source of a communication network using a TDMA frame structure by periodically listening for a certain wake-up time period for beacon packets, wherein the beacon listening periodicity differs from the beacon transmission periodicity by a given percentage.

WO 2004/110099 A2 relates to an audio communication network using frequency hopping, wherein LMP (link management protocol) messages are used for network acquisition and wherein the position of the time interval used for scanning for LMP messages is randomized such that there can be an overlap in time with a LMP message after some time.

It is an objective of the disclosure to provide for a wireless audio transmission method, wherein reception of an audio stream should be enabled while searching for another audio stream. It is a further objective to provide for a corresponding audio receiver device.

According to the some embodiments of the disclosure, this objective is achieved by a method as defined in claim 1 and an audio receiver device as defined in claim 26, respectively.

The audio receiver device, while receiving audio packets of the first audio stream from the first audio streaming device, scans for frequency hopping synchronization (FHS) packets transmitted from a second audio streaming device in a manner so as to enable reception of at least one audio packet per frame from the first audio stream by preventing collision of the scan window with the respective audio packet slot or slots in the first audio stream. Thereby the quality of the audio reception of the first stream can be kept at an acceptable level while simultaneously allowing detection of at least one other audio stream.

Some embodiments are defined in the dependent claims.

Examples of the disclosure are illustrated by reference to the drawings, wherein.

Figure 1:
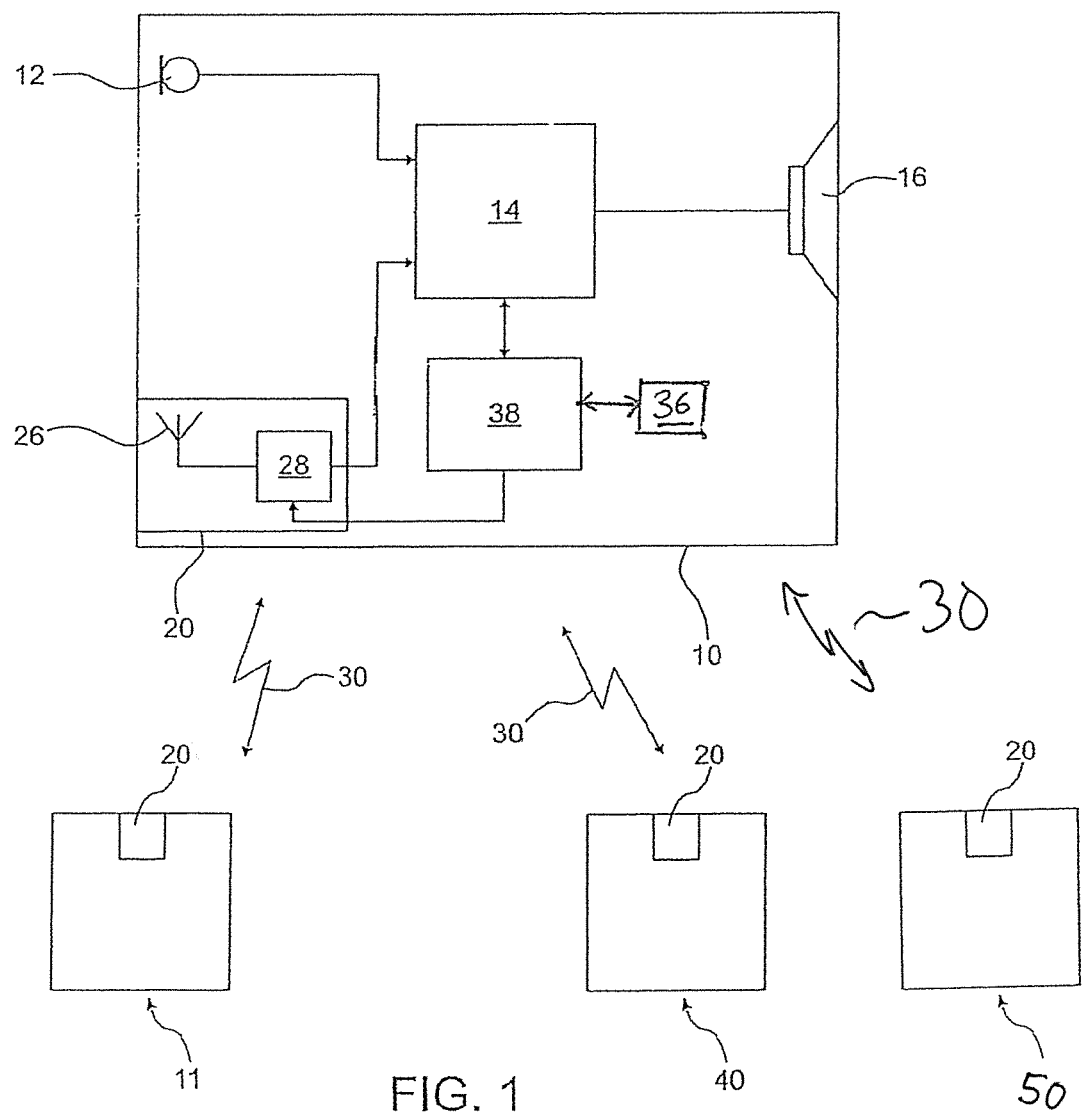
FIG. 1 is a schematic illustration of an example of a wireless hearing assistance system.

The drawings have not necessarily been drawn to scale. Similarly, some components and/or operations may be separated into different blocks or combined into a single block for the purposes of discussion of some of the embodiments of the disclosure. Moreover, while the disclosure is amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure as defined by the appended claims.

A "scan window" is a time interval during which the audio receiver device listens for FHS packets. The "scan window length" is the duration of this time interval. The scan window may be repeated periodically; in this case a "period" is a time interval after which the repetition occurs (a period corresponds to one cycle). Accordingly, a "scan window period" is the time interval from e.g. the start of a scan window to the start of the next scan window, and the "scan window period length" is the duration of this time interval. "Periodicity" may be used a synonym of "period length". These terms are analogously used for the transmission of FHS packets and audio packets.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. In some implementations, the machine-readable medium is non-transitory computer readable medium, where in non-transitory excludes a propagating signal. In some embodiments, the devices disclosed in FIG. 1 perform some or all of the operations described in FIGS. 2 to 13.

FIG. 1 is a block diagram of an example of a hearing device 10 to be worn at one ear of a user which typically is used together with a second hearing device to be worn at the other ear of the user so as to form a binaural hearing system. In some implementations, the hearing device 10 is a hearing instrument, such as RIC (receiver in the canal), BTE (behind-the-ear), ITE (in-the-ear), ITC (in the canal) or CIC (completely-in-the-canal) hearing aid. However, the hearing device, for example, also could be an auditory prosthesis, such as a cochlear implant device comprising an implanted cochlear stimulator and an external sound processor which may be designed as a BTE unit with a headpiece or as an integrated headpiece.

In the example of FIG. 1, the hearing device 10 is a hearing aid comprising a microphone arrangement 12 for capturing audio signals from ambient sound, an audio signal processing unit 14 for processing the captured audio signals and an electro-acoustic output transducer (loudspeaker) 16 for stimulation of the user's hearing according to the processed audio signals. In some implementations, the audio signal processing in the unit 14 may include acoustic beamforming (in this case, the microphone arrangement 12 comprises at least two spaced apart microphones).

The hearing aid 10 comprises a wireless interface 20 comprising an antenna 26 and a transceiver 28. The interface 20 is provided for enabling wireless data exchange between the first hearing aid 10 and external devices 11, 40. For example, the hearing aid 10 may be connected to a second hearing aid (e.g., as the external device 11) via a wireless link 30 which serves to realize a binaural hearing assistance system, allowing the hearing aids to exchange audio signals and/or control data and status data, such as the present settings of the hearing aids.

The interface 20 is also provided for data exchange via a wireless link 30 with at least one further external device, for example for receiving an audio data stream from an external device acting as an audio source. Such external devices are illustrated at 40 and 50 in FIG. 1

The hearing aid 10 also comprises a control unit 38 for controlling operation of the hearing aid 10, with the control unit 38 acting on the signal processing unit 14 and the transceiver 28, and a memory 36 for storing data required for operation of the hearing aid 10 and data required for operation of the interface 20, such as pairing/network data.

The hearing device 10 may receive an audio stream from another device 11 via a wireless link 30, with the hearing device 10 then acting as an audio receiver device and the other device 11 acting as an audio streaming device. To this end, the hearing device 10 has to be connected to the other device 11 via a suitable wireless protocol having a time-slotted frame structure wherein certain time slots in each frame are dedicated to certain activities; for example, at least one of the slots in each frame is used for transmission of an audio data packet from the audio streaming device to the audio receiver device. In some implementations, each audio data packet is transmitted not only once but several times, for example three times, so as to provide for a certain redundancy to avoid loss in audio quality when an audio packet is not received by the audio receiver device, for example due to an interfering signal (in such case at least one of the two copies will be received, thereby effectively avoiding packet loss).

An audio stream may include audio data only or audio data of the audio stream may be part of a media stream including audio and video data, e.g., the audio stream also may include video data. Typically, an audio stream is transmitted from an audio source to a plurality of audio sinks by broadcasting, e.g., the audio source acts as a broadcasting device that unidirectionally sends information to the receiver devices, wherein the receiver devices cannot provide feedback to the broadcasting device as to whether the information, e.g. an audio packet, was received or not, e.g., there is no uplink.

Typically, audio streaming requires an isochronous data stream, which means that audio data flows continuously and at a steady rate.

Figure 2:
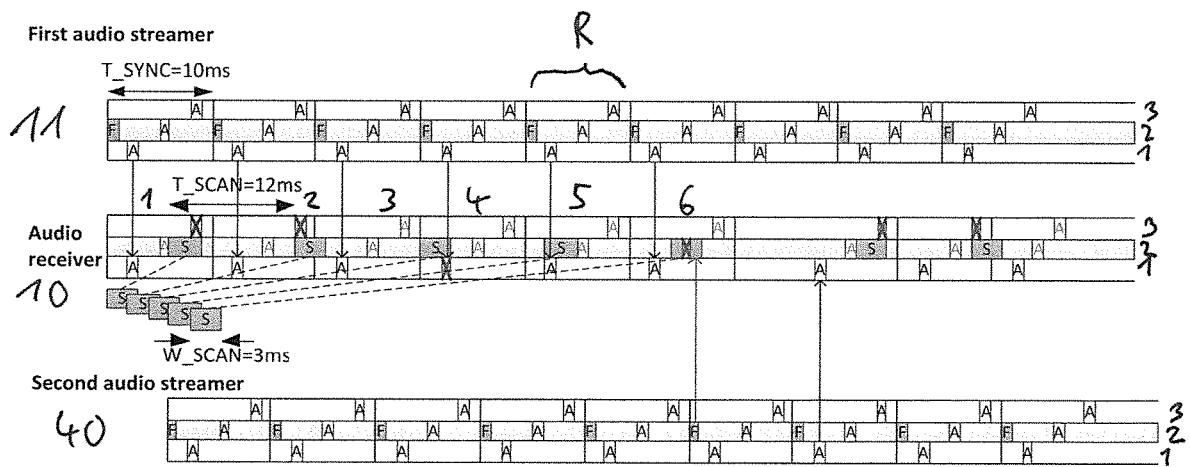
FIG. 2 is an illustration of an example of a scanning activity of an audio receiver device, while receiving a first audio stream, for detection of a second audio stream.

A simplified example of such audio streaming process is illustrated in FIG. 2 wherein a first audio streamer, for example the device 11, uses a sequential frequency hopping for transmitting an audio packet three times in each frame R using a fixed sequence of three transmission channels #1, #2 and #3. For example, the first audio packet may be transmitted in channel #1, the first copy of the same audio packet may be transmitted in channel #2 and the second copy of the audio packet may be transmitted in channel #3. The time slots dedicated to audio packet transmission in each frame R are labeled "A" in FIG. 2.

Usually, the frequency hopping sequence in practice will be more complex, with more channels being involved, and will not be fixed but rather variable according to a pseudo-random sequence which is known to or can be calculated by both connected devices 10 and 11. When two devices are connected, their clocks are synchronized so that they have a common time base and they both know or can calculate the frequency hopping sequence. Thus, the audio receiver device 10 knows when transmission of audio data packets is to be expected and in which channel this will occur, so that the audio receiver device will listen during the respective slots "A" in the respective channel. Reception of an audio data packet by the audio receiver device 10 is indicated by vertical arrows in FIG. 2.

In addition to the audio data packets, the audio streaming device transmits data packets containing information required for connecting to the audio streaming device so as to receive its audio stream. Such information includes clock information so as to synchronize the clocks and information concerning the frequency hopping sequence used by the audio streaming device. Data packets conveying such information hereinafter will be referred to as frequency hopping synchronization (FHS) packets; in FIG. 2 such FHS packets are labeled "F". In some implementations, the FHS packets may be transmitted periodically, for example once in each frame R or once every n-th frame, so that a certain slot "F" is dedicated in each frame or in every n-th frame for transmission of a FHS packet.

Figure 3:
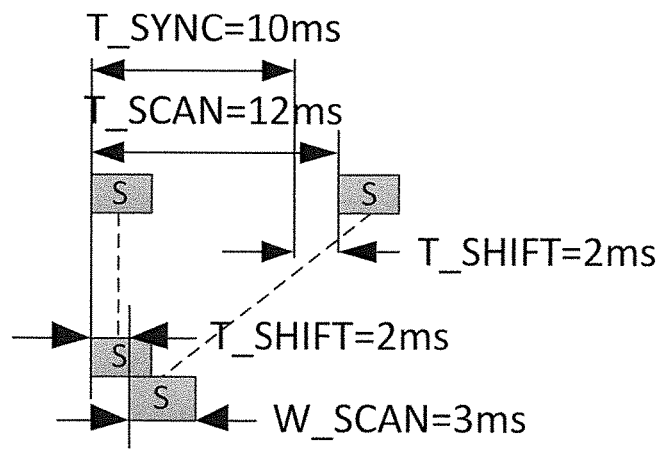
FIG. 3 is an enlarged illustration of the relationship between the scan window period and the FHS packet period of the example of FIG. 2.

Usually the transmission of FHS packets does not use the full frequency range of the protocol, so that only a subgroup of the available channels is used. In the example of FIG. 3 only channel #2 is used for transmission of FHS packets. The channel or the channels used for transmission of FHS packets usually are known also to devices which are not yet connected to the audio streaming device, while the actual sequence of these channels (which may be labelled "synchronization channels") may be variable and then is not known to the devices wishing to connect to the audio streaming device.

Typically, the audio streaming device acts as a "master", while the audio receiver devices act as "slaves".

To receive a FHS packet, the audio receiver device may listen during certain time windows for FHS packets; such time windows may be referred to as "scan windows" and are labelled "S" in FIG. 2. However, since the device wishing to connect to an audio streaming device (such device may be referred to as a "scanning device") is not yet synchronized with the audio streaming device and therefore does not know when transmission of a FHS packet is to be expected.

In FIG. 2 an example is illustrated, wherein the audio receiver device 10 scans for FHS packets from another audio streaming device, namely a second audio streaming device 40, while receiving audio data packets from the first audio streaming device 11. It is desirable that the scanning by the audio receiver device 10 for the second audio streaming device 40 occurs in such a manner that the scanning action has no or only little impact on the audio quality of the audio stream received from the first audio streaming device 11. To this end, the scanning activity by the audio receiver device 10 takes place in a manner so as to enable reception of at least one audio packet per frame of the audio stream from the first audio streaming device 11 by preventing collision of the scan windows with at least one audio packet slot per frame of the audio stream from the first audio streaming device 11. Examples of such scanning strategy will be discussed in more detail below.

There are several options for the audio receiver device 10 how to react once it has received a FHS packet from the second audio streaming device 40 (this happens when there is an overlap in time and frequency between the transmission of an FHS packet from the second audio streaming device 40 and a scan window "S" of the audio receiver device 10).

In some implementations, the audio receiver device may automatically disconnect from the first audio streaming device and may connect to the second audio streaming device so as to receive, from then on, the (second) audio stream from the second audio streaming device rather than the (first) audio stream from the first audio streaming device. For example, the audio receiver device may switch from the first audio streaming device to the second audio streaming device only if the received signal strength of the second audio stream is above a given threshold. In some implementations, the audio receiver device may switch from the first audio stream to the second audio stream only in case that the received signal strength of the second audio stream is higher than the received signal strength of the first audio stream, so that the audio receiver device is enabled to always connect to the audio stream having the highest signal strength, which is usually the audio stream from the nearest audio streaming device.

For example, an audio receiver device may automatically switch from a first audio stream provided by TV streamer in the living room to a second audio stream provided by a radio device in the kitchen. Other examples are automatic switching between audio streams provided by different wireless microphones or headsets.

In some implementations, the audio receiver device, once having received an FHS packet from the second audio streaming device, may provide for a notification to the user, such as by an appropriate acoustic signal, so as to enable the user to perform a gesture to connect the audio receiver device to the second audio streaming device. In other words, the decision concerning the switching from the first audio stream to the second audio stream may not occur automatically but rather may be taken by the user of the audio receiver device.

In some implementations, the first and second audio stream may use the same protocol, such as a proprietary protocol. In some implementations, the first audio stream and the second audio stream may use different protocols; for example, the first protocol may be a proprietary protocol and the second protocol may be a standard protocol, such as a Bluetooth protocol.

In the example illustrated in FIG. 2 the second audio streaming device 40 uses the same protocol as the first audio streaming device, wherein the FHS packets are transmitted periodically, for example once in each frame R. In such case the periodicity (the length or duration of one period) of the FHS packet transmission ("T_SYNC") equals the length of the frame R; also the periodicity (period length) of the audio packet transmission equals the frame length and thus the FHS packet transmission period length. The frame length (duration of one frame R) may be, for example, 10 ms.

In some implementations, an example of which is illustrated in FIG. 2, scanning by the audio receiver device takes place during periodically repeated scan windows whose duration ("W_SCAN") is selected such that reception of at least one audio packet per frame of the first audio stream is enabled by preventing collision of the scan window with at least one audio packet slot of the first audio stream, and wherein the scan window periodicity (period length) ("T_SCAN") is selected such that there is a certain overlap of each scan window with one of the subsequent scan windows when taking into account the periodicity of the FHS packet transmission of the second audio stream.

In other words, the "overlap" is visible when the "overlapping" two scan windows are "mapped" into the same FHS packet transmission period by shifting back in time the later scan window by an appropriate multiple of the FHS packet period length T_SYNC, so that the earlier one and the later one of the "overlapping" two scan windows are located in the same FHS packet period. Mathematically, such mapping uses a "modulo T_SYNC" operation.

In some implementations, the overlap between two scan windows, when mapped into the same FHS packet period, corresponds at least to the duration or length of the start frame delimiter (SFD) of the FHS packets (once the SFD of a FHS packet is received by the audio receiver device, which is the case when the SFD falls within one of the scan windows, the reception window (scan window) may be automatically extended to receive the respective packet in full if the radio chip is accordingly configured (alternatively, rather than using the SFD the address or address code of the packet may be used in some implementations).

An example of the mapping of the scan windows S into the same FHS packet period is illustrated in FIG. 2, wherein all scan windows, namely the scan windows in frames 1 to 6 of the audio receiver device, are "mapped" into the first frame by shifting the scan windows 2 to 5 back in time by an appropriate multiple of the FHS packet period length T_SYNC (the second scan window is shifted by one FHS packet period, the third scan window is shifted by two FHS packet periods, the fourth scan window is shifted by three FHS packet periods, etc.).

In case that the scan window periodicity T_SCAN is longer than the FHS packet periodicity T_SYNC (or the audio packet periodicity or the frame length, which all are the same in the example of FIG. 2) an overlap of "mapped" scan windows is achieved by selecting a scan window periodicity which is different from any multiple of the FHS packet periodicity; this condition also may be written as: T_SCAN modulo T_SYNC≠0. In case that the scan window periodicity is smaller than the FHS packet periodicity, none of the multiples of the scan window periodicity must be a multiple of the FHS packet periodicity (T_SCAN*N modulo T_SYNC≠0, where N is an integer).

It is to be noted that the two scan windows which overlap when mapped into the same FHS packet period do not have to be two immediately adjacent scan windows. Rather, for example, the scan window pattern could be such that not the first and second scan windows of FIG. 2 overlap but rather the first and fifth.

The difference of the scan window periodicity T_SCAN and the FHS packet periodicity T_SYNC results in a shift of the subsequent scan window relative to the FHS packet periodicity, as illustrated in FIG. 3, wherein an example is shown for a FHS packet periodicity of 10 ms and a scan window periodicity of 12 ms. This results in a relative shift T_SHIFT of the next scan window of 2 ms (resulting from 12 ms minus 10 ms=2 ms, or T_SHIFT=T_SCAN modulo T_SYNC=12 ms modulo 10 ms=2 ms); the duration of the scan window W_SCAN is 3 ms. This results in an overlap of the first and second scan window (when the second scan window is mapped into the first FHS packet period by shifting it back in time by 1*T_SYNC=10 ms), of 1 ms.

A typical duration for a start frame delimiter is 40 μs, which is the duration of 5 bytes at a rate of 1 Mbps or 10 bytes at a rate of 2 Mbps. Thus, an overlap of 1 ms, as in the example of FIG. 4, in practice would by far too long (this relatively large overlap is used in FIGS. 3 and 4 for the sake of clarity of the drawings).

In the example of FIGS. 2 and 3 the full duration of 10 ms of one audio frame R (or one FHS packet period) is covered after 5 sequential scan windows, so that at the latest after five scan window periods S (corresponding to six audio frames R) one FHS packet will fall within a scan window so that it can be received; thus, the latency in this case would be 5*12 ms=60 ms (it depends on the relative phase shift between the frames of the audio receiver device and the frames of the second audio streaming device in which scan window the FHS packet actually will be received).

While in the representation of FIGS. 2 and 3 the scan window periodicity, for the sake of simplicity of the drawings, is not much larger than the audio frame periodicity, in practice the scan window periodicity will be much larger than the audio periodicity so as to spend only little current for scanning. For example, with a scan window length of 3 ms, the scan window periodicity could be chosen to be 102 ms, in which case the scan duty cycle would be 3/102=2.9%. In this case, since five scan window periods would be needed to cover a complete audio frame of 10 ms, with the latency (maximum detection delay) being 5*102 ms=510 ms.

Figure 4:
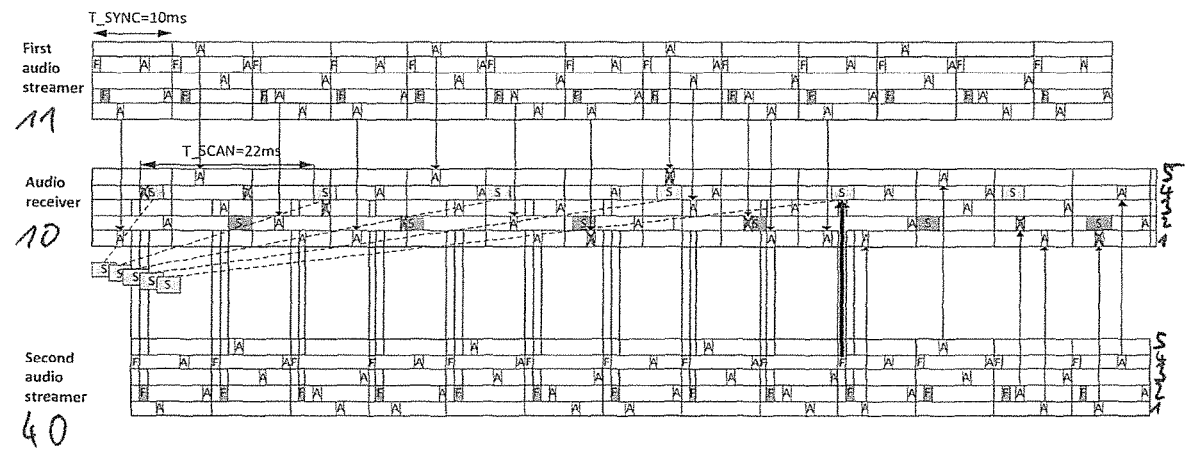
FIG. 4 is an illustration similar to FIG. 2, wherein, however, an example using two synchronization channels is shown.

While in the example of FIG. 2 only a single channel/frequency is used for transmitting FHS packets, in some implementations a plurality of channels may be used to provide more robustness to interference. In general, the transmission of FHS packets and the periodic scan in each channel can be considered as parallel and independent activities. In FIG. 4 an example is shown wherein the second audio streaming device transmits an FHS packet in two different channels 2 and 4 in each frame, while the audio receiver device performs scanning in parallel in these two channels.

In some implementations the audio receiver device, as illustrated in FIG. 2, may scan only for a single second audio stream having a fixed and known FHS packet periodicity. However, in some implementations the audio receiver device may scan for one second audio stream which may have at least two different FHS packet periodicities (for example, the protocol used by the second audio streaming device may allow for the selection of the FHS packet periodicity from a set of different values), or the audio receiver device may scan for at least two further audio streams (e.g., a second and a third audio stream) which are known to have different FHS packet periodicities.

In cases in which there is a set of different FHS packet periodicities the scan window periodicity is selected in such a manner that the "overlap" conditions described above for a single FHS packet periodicity applies for each of the FHS packet periodicities.

Figure 5:
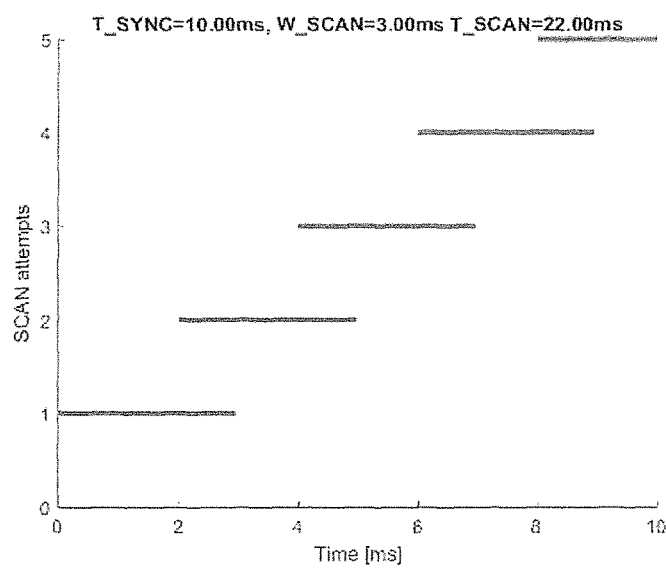
FIGS. 5 to 7 are illustrations of the use of a single scan window periodicity for detection of FHS packets of three different periodicities, wherein subsequent scan windows are shown in a single FHS packet period.
Figure 6:
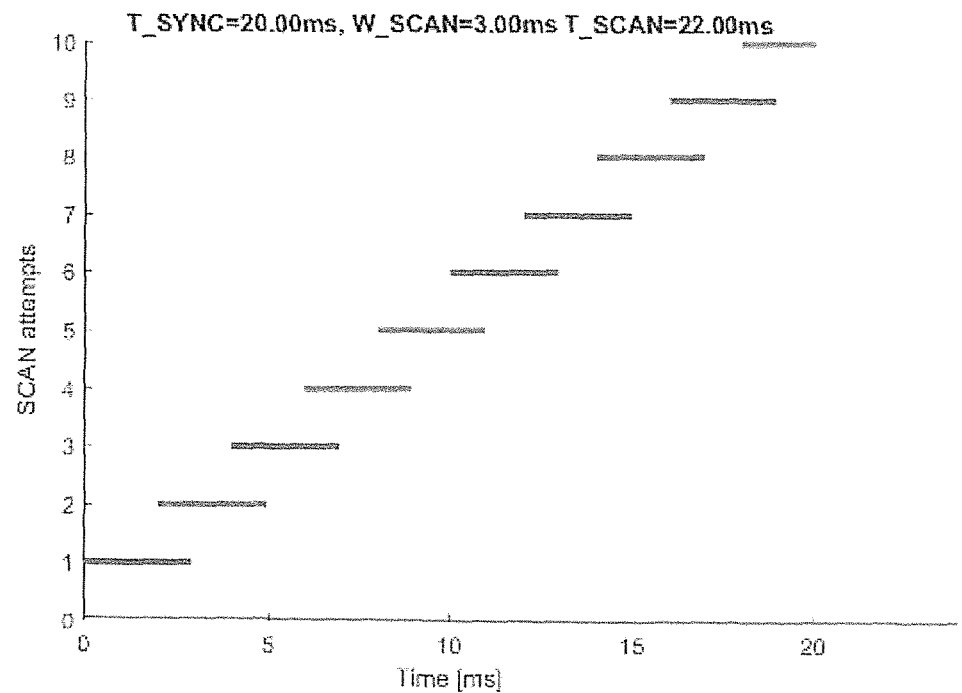
Figure 7:
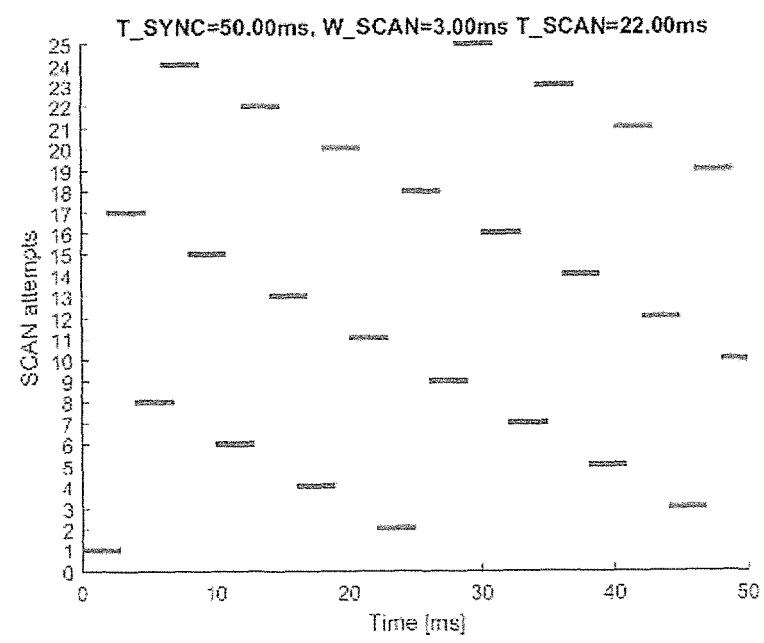

An example for a scan window periodicity which meets with the "overlap" condition for several FHS packet periodicities is illustrated in FIGS. 5 to 7, wherein a scanning procedure similar to that of FIG. 2 is used, with a scan window length W_SCAN of 3 ms and a scan window periodicity T_SCAN of 22 ms being used for scanning for FHS packets having a periodicity T_SYNC of 10 ms (FIG. 5), 20 ms (FIG. 6) and 50 ms (FIG. 7), respectively. In FIGS. 5 to 7 a single FHS packet period having a length of 10 ms, 20 ms and 50 ms, respectively, is shown, into which 5, 10 and 25 scan windows, respectively, have been "mapped", wherein the n-th scan window is indicated at a vertical position n and has a horizontal dimension corresponding to its length/duration of 3 ms. It can be seen that for all three FHS packet periodicities there is a pairwise overlap between two scan windows of 1 ms. In the cases of an FHS packet periodicity of 10 ms and 20 ms, respectively, which is shorter than the scan window periodicity of 22 ms, there is always an overlap between adjacent scan windows, whereas in the case of a FHS packet periodicity of 50 ms, which is longer than the scan window periodicity of 22 ms, the overlapping scan windows are not adjacent scan windows.

Consequently, by using a single pair of scan window duration (3 ms) and scan window periodicity (22 ms), it is possible to cover three different FHS packet periodicities of 10 ms, 20 ms and 50 ms.

In the example of FIG. 2 the scan window length of 3 ms allows the reception of at least two of the three audio packets per frame (the audio packet slot which collides with the scan window is marked by "X" in FIG. 2, see audio frames 1, 2, 5 and 6). Thus, even if one of the two audio reception slots in each frame which do not collide with the scan window does not result in successful reception of the audio packet, there will be still a second chance in each frame for receiving a copy of the audio packet while simultaneously scanning for FHS packets of the second audio stream.

Having a second chance in each frame for receiving a copy of the audio packet provides a robust audio reception in the case of packet losses due for example to interference. In some implementations, a good audio quality is achieved if the audio frame error rate is at most 1c/o. With two reception chances, a packet error rate of up to 10% can be tolerated, since, with such packet error rate the probability to lose both the first and the second copy is 10%*10%=1%.

Figure 8:
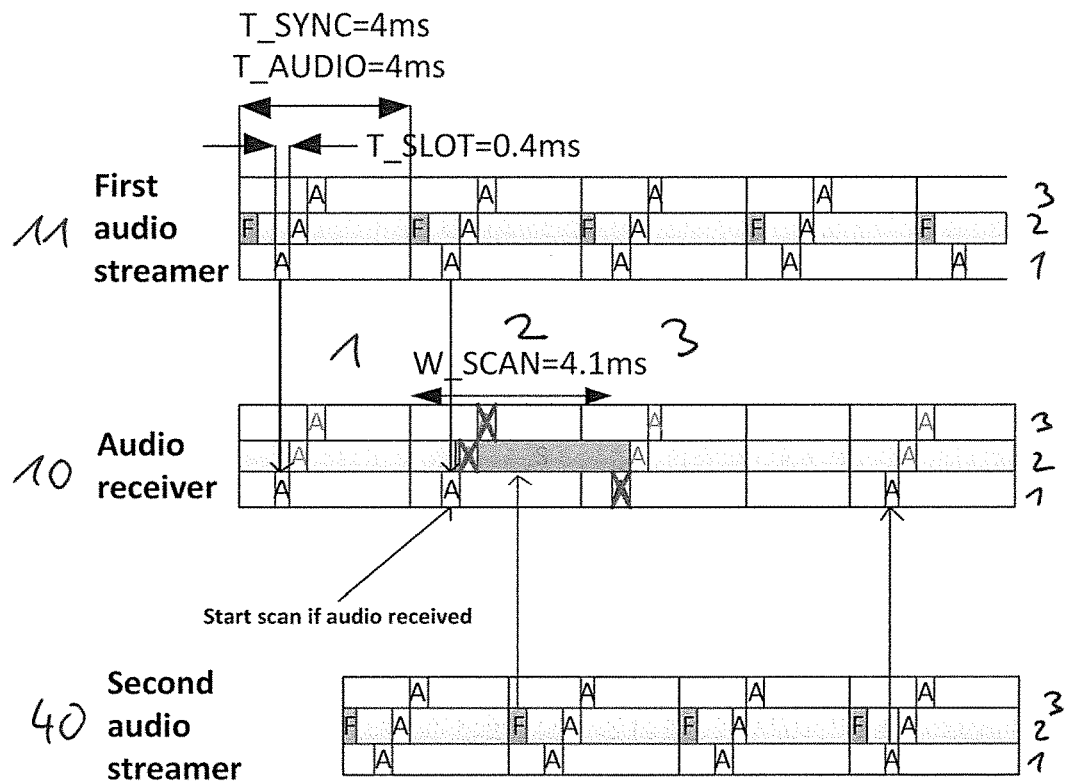
FIG. 8 is an illustration of an alternative example of a scan activity of an audio receiver device, while receiving a first audio stream, for a second audio stream.

In some implementations, which are illustrated by the example shown in FIG. 8, the duration of the scan window is selected such that it covers a full FHS packet period, so that a single scan window in principle is sufficient for securely receiving one FHS packet—irrespective of the relative phase of the audio receiver device frames relative to the frames of the second audio stream. In the example illustrated in FIG. 8 the frame length (or audio packet periodicity) of the first audio stream is 4.0 ms, the FHS packet periodicity of the second audio stream is likewise 4.0 ms, the duration of an audio packet reception slot is 0.4 ms, and the duration of the scan window W_SCAN is 4.1 ms. Further, the phase and the duration of the scan window are selected such that reception of at least one audio packet per frame of the first audio stream is enabled by preventing collision of the scan window with at least one audio packet slot per frame of the first audio stream.

To this end, the scan window starts after the first audio reception slot in a certain frame, for example frame #2 and FIG. 8, if the audio packet reception in that first audio reception slot was successful, and terminates at least before the start of the last audio reception slot in the next frame (frame #3 in the example of FIG. 8). This enables reception of at least one audio packet per frame even in those frames in which there is scanning activity (frames 2 and 3 in FIG. 8): In frame #2 already an audio packet was received successfully (otherwise the scanning activity would not start in frame #2), and in frame #3 there is at least the chance to receive an audio packet in the last audio reception slot of frame #3. In some implementations, as illustrated in the example of FIG. 8, the scan window already terminates at the latest before the start of the second audio packet slot in the next frame (frame #3) so as to allow reception of at least two audio packets in the next frame (frame #3); this enhances audio quality since, for example, if reception in the last audio slot of Frame 3 fails—for example due to interference—there will be the chance to receive an audio packet in the second audio reception slot of frame #3.

In some implementations, the scan window duration is selected such that it is at least the FHS packet periodicity T_SYNC of the second audio stream plus the length of the start frame delimiter of the FHS packets (as already mentioned above, reception of the SFD of the FHS packet is sufficient to receive the full FHS packet in case that the audio chip is instructed accordingly so as to continue the scan window after reception of the SFD until the full packet is received).

In the example of FIG. 8 the audio transmission and reception time slots have a duration of 400 µs, while the audio packets as such have a duration of 164 µs, since the last portion of a time slot in a frequency hopping system usually is not used for radio transmission but rather is used for changing the radio frequency. Thus, the scan window may already start some time before the end of the first audio reception slot, for example 100 µs, before the end of the slot, since it is already clear at that time that an audio packet was successfully received.

For the sake of simplicity, in FIG. 8 only a single FHS packet channel is shown, while, as in the example of FIG. 4, there may be more than one FHS packet channel.

In some implementations, the scan window of the example of FIG. 8 is repeated periodically, wherein the periodicity is selected so as to correspond to a maximum acceptable connection latency with regard to detection of the second audio stream. For example, a scan window periodicity of 2.5 s would provide for a scan duty cycle overhead of 4.1 ms/2500 ms=0.16%; with a current consumption of 6.5 mA in the radio reception mode, this would result in a current consumption overhead of 0.0016*6500 mA=10 mA. As already mentioned above, the selection of the scan window periodicity is a tradeoff between the detection latency of the second audio stream and the energy spent for searching for the second audio streaming device.

A main difference to the example of FIGS. 2 and 3 is the fact that in principle a single scan window is sufficient for receiving one FHS packet while in the example of FIGS. 2 and 3 a certain number of scan windows, for example 5, is required.

The principle illustrated in FIG. 8 is particularly suitable for cases in which the FHS packets are transmitted periodically with a periodicity which is not longer than the duration of the scan window (the upper limit of the duration of the scan window is determined by the periodicity, length and distribution of the audio slots in the frame of the slots of the first audio stream).

In some implementations, the duration and starting point of the scan window is selected so as to receive the FHS packets from a second audio streaming device, as illustrated in FIG. 8, while in addition the scan windows may be periodically repeated so as to scan for a further audio streaming device (third audio streaming device) having an FHS packet periodicity different from that of the second audio streaming device, with the periodicity of the scan windows being selected by using the principles illustrated with regard to FIGS. 2 and 3 (so as to obtain sufficient "overlap" of the "mapped" scan windows, with a certain number of "mapped" scan windows covering an entire FHS packet period). In other words, the principles illustrated in FIGS. 2 and 3 and the principles illustrated in FIG. 8 may be combined.

In some implementations, the audio receiver device and the first and second audio streaming devices may use the same proprietary protocol, while the third audio streaming device may use a standard protocol, such as a Bluetooth protocol. A standard protocol may allow for a variety of values of the FHS packet period T_SYNC; for example, the FHS packet periodicity may be a multiple of 1.25 ms (which is twice a Bluetooth slot duration). Thus, in the example of FIG. 8, wherein the scan window duration W_SCAN is 4.1 ms, all FHS packet periodicities shorter than the scan window duration minus the SFD duration (which may be, for example, 40 µs), which is 4.060 ms, are covered. Thus, the FHS packet periodicities 1.25 ms, 2.5 ms and 3.75 ms would be covered by a single scan window of a duration of 4.1 ms.

However, for larger values an appropriate periodicity has to be selected. For example, it can be found by a "brute force" coverage search over all values T_SCAN of the scan window periodicity which are a multiple of the audio periodicity T_AUDIO=4 ms of the first audio streaming device that a scan window periodicity value of 964 ms covers all FHS packet periodicity values from the set {1.25 ms, 2.5 ms, . . . , 100 ms}. The resulting average current consumption caused by such scan activity would be 4.1 ms/964 ms*6500 µA=28 µA Such a coverage search may be conducted by calculating, for each FHS packet period value T_SYNC and for many scan window periodicity values T_SCAN, in which portion of the FHS packet period the successive scan windows will end up. The number of successive scan windows needed to cover the entire FHS packet period is recorded for each scan window periodicity value. If after a certain number of successive scan windows, for example 100 successive scan windows, the FHS packet period still cannot be covered in full, then this scan window periodicity value is not considered to be a candidate. This situation may happen when an integer multiple of the scan window periodicity can be divided by the FHS packet periodicity, as already discussed above (mathematically, this condition is: T_SCAN*N_SCAN modulo T_SYNC=0, where N_SCAN, which is the number of scan windows, is an integer). At the end of the search, a list of suitable candidate values of the scan window periodicity is obtained. From this list that scan window periodicity value may be selected which is closest to a target scan window periodicity and that provides the smallest required number of scan windows for receiving a FHS packet.

The target scan window periodicity may be determined from the allowable power consumption of the radio receiver which may be dedicated to this scan activity. In this regard, the overall power consumption of the audio receiver device has to be taken into account as well as the stream detection latency performance resulting from the target scan window periodicity. Generally, a higher allowable power consumption dedicated to the scan activity results in a lower (shorter) latency, so that a certain balance has to be found. In some implementations, the detection latency should be not more than a few seconds. The acceptable detection latency is determined by usability criteria of the audio receiver device. According to some implementations, the detection latency should be shorter than 10 s, e.g., shorter than 3 s or shorter than 1 s. According to the above example, a scan window duration of 4.1 ms and a scan window periodicity of 964 ms would result in an average power consumption of 28 µA of the radio receiver dedicated to the scan activity. The power consumption of the scan activity results in a reduced battery lifetime of the audio receiver device. For example, with a zinc-air battery with a current capacity of 130 mAh and an average current of 0.8 mA, the lifetime would be reduced from 162.5 h to 157 h, which is a reduction by about 3%.

Figure 12:
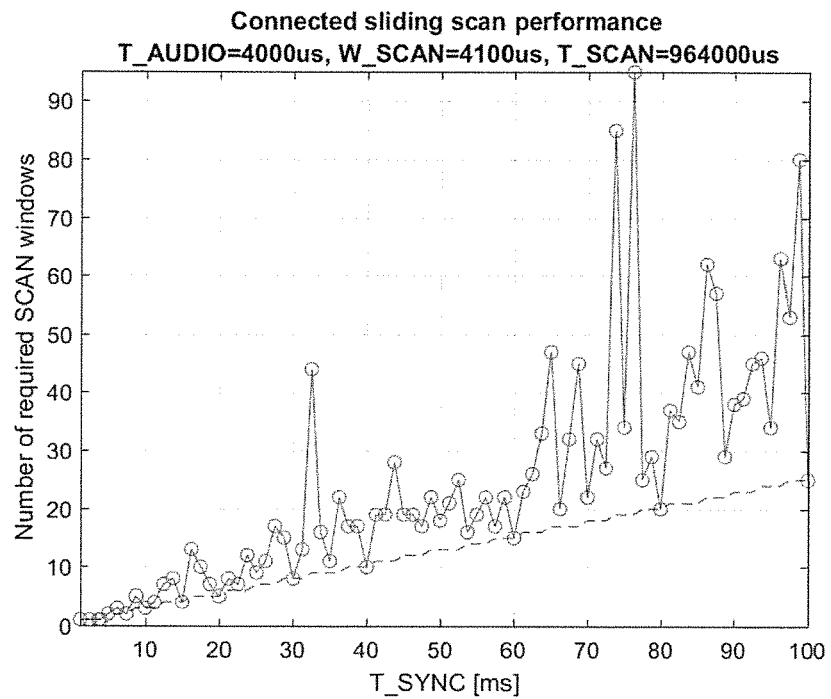
FIG. 12 is an illustration of the number of required scan windows for detecting a FHS packet for a certain scan window periodicity as a function of the FHS packet periodicity.

FIG. 12 is a diagram which shows the performance, namely the number of required scan windows, of the above discussed scanning activity with a scan window duration of 4.1 ms and a scan window periodicity of 964.0 ms as a function of the FHS packet periodicity (more precisely, for the set of multiples of the Bluetooth time base of 1.25 ms up to 100 ms). The dashed line in FIG. 12 represents the lower limit of the number of required scan windows, which is given by FHS packet periodicity T_SYNC minus (scan window duration W_SCAN minus duration T_SFD of start frame delimiter). The resulting detection delay is given by: T_SCAN*[1+N_SCAN], which is the time needed to perform all required N_SCAN scan windows (T_SCAN is the scan window periodicity). For example, for T_SYNC=10 ms and N_SCAN=5 the resulting detection delay is 5784 ms.

It can be seen in FIG. 12 that up to an FHS packet periodicity of 11 ms the performance of the above procedure is nearly optimal, while for lager FHS packet periodicity values the number of required scan windows may deviate from the optimal value.

Figure 9:
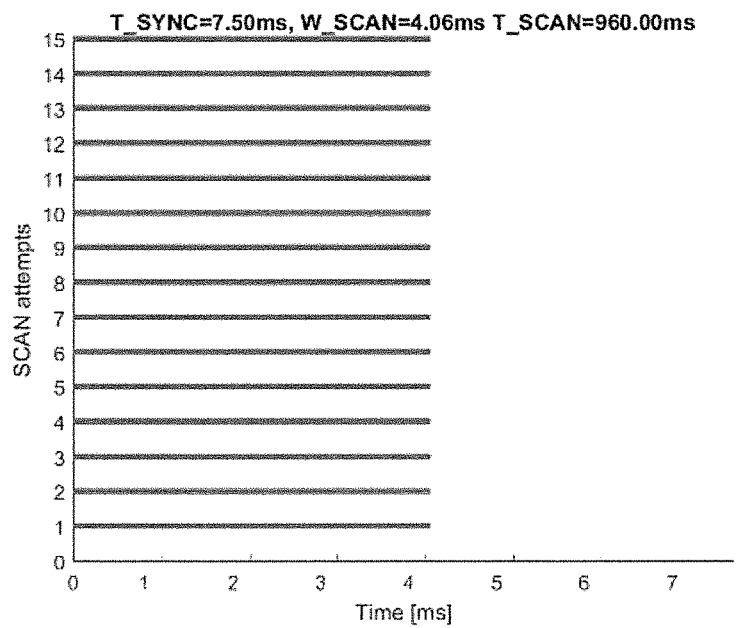
FIGS. 9 to 11 are illustrations similar to FIGS. 5 to 7, wherein, however, an inappropriate selection of a scan window periodicity is shown for three different FHS packet periodicities.
Figure 10:
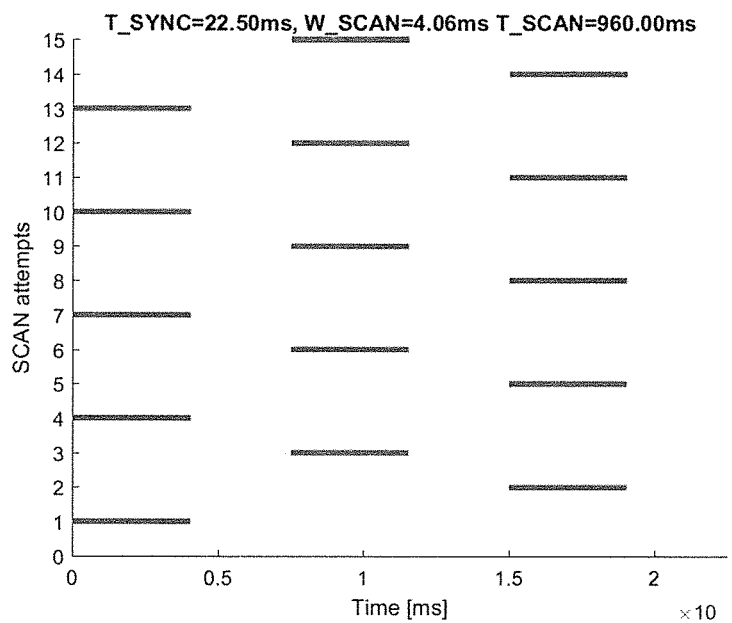
Figure 11:
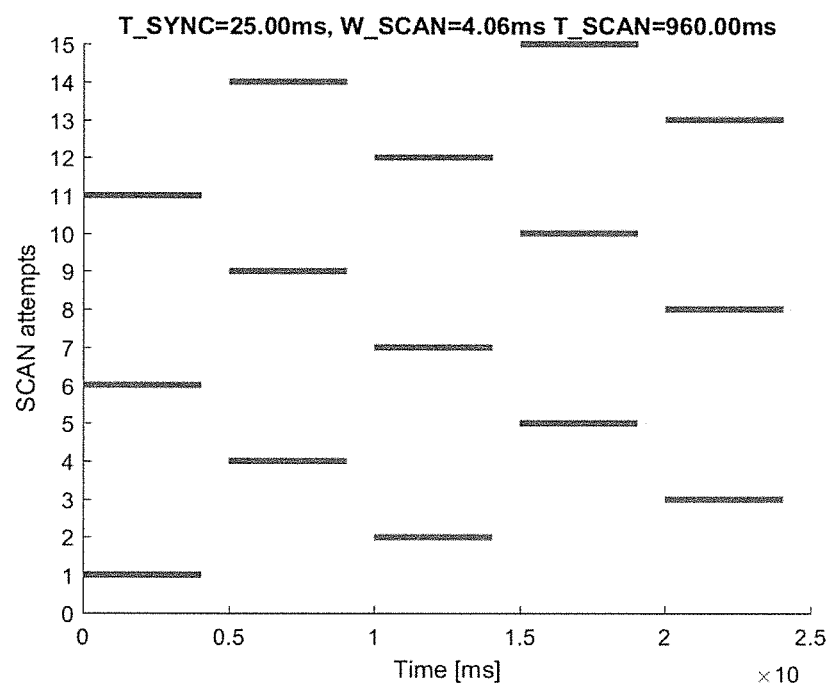

In FIGS. 9 to 11 the consequences of an inappropriate selection of the scan window periodicity, namely for T_SCAN=960 ms, are illustrated. More in detail, FIGS. 9 to 11 are diagrams similar to that of FIGS. 5 to 7, wherein the scan windows are mapped into a single FHS packet period for a scan window duration of 4.06 ms and a FHS packet periodicity T_SYNC of 7.50 ms (FIG. 9), 22.5 ms (FIG. 10) and 25.00 ms (FIG. 11), respectively. It can be seen, that in these cases there is no full coverage of the FHS packet period by the scan windows.

Figure 13:
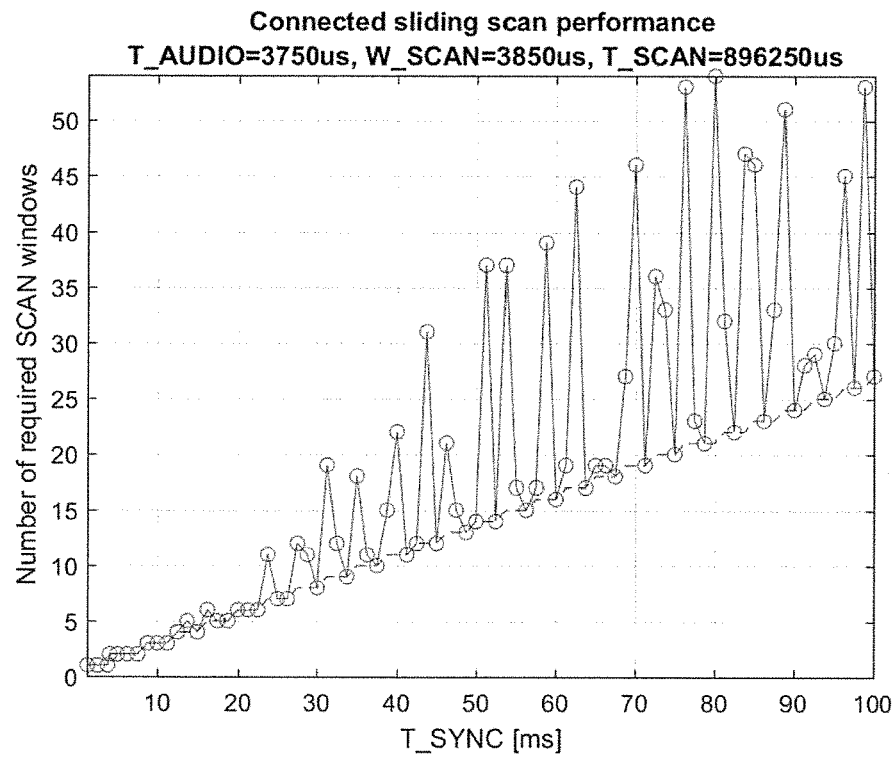
FIG. 13 is an illustration similar to FIG. 12, wherein, however, another example is shown.

The above discussed concepts also may be applied to systems in which the first audio stream uses a standard protocol, such as a Bluetooth protocol, rather than the proprietary protocol illustrated in the example of FIG. 8, and wherein the second (and third) audio streaming devices may use a standard protocol or a proprietary protocol. For example, the first audio streaming device may transmit an audio stream using a standard protocol with an audio periodicity/frame length of 3.75 ms. Assuming again that the scan window may start 100 µs before the end of the time slot where the first audio packet copy was received successfully and ends before the start of the second audio copy in the next audio frame, the scan window duration for example could be 0.1 ms plus 3.75 ms=3.85 ms. In that case, a suitable value for covering all FHS packet periodicities between 1.25 and 100 ms (more precisely, all multiples of 1.25 ms up to 100 ms) would be 896.25 ms, as illustrated in FIG. 13, which is a diagram analog to the diagram of FIG. 12, wherein the number of required scan windows is given for all FHS packet periodicities which are multiples of 1.25 ms, up to 100 ms.

In some implementations, an FHS packet may be implemented as part of an audio packet which explicitly or implicitly includes the information required to connect to the audio stream. In other words, in some implementations the FHS packets may be part of audio packets; in other implementations, FHS packets may be separate from the audio packets, as illustrated in FIGS. 2 to 4 and 8.

As already discussed above, the FHS packets may be transmitted periodically, wherein the periodicity may be defined by a proprietary protocol or, in case of Bluetooth protocols, may be a multiple of the time base value of 1.25 ms.

In some implementations, however, the FHS packets may be transmitted on a random time base, so that, for example, the time interval between transmission of a FHS packet and the transmission of the subsequent FHs packet is randomized within a given range so that the time interval is selected by a random process from a certain minimum time to a certain maximum time. An example of randomized packet transmission is found in Bluetooth Low Energy advertisement.

The phrases "in some implementations," "according to some implementations," "in the implementations shown," "in other implementations," and generally mean the particular feature, structure, or characteristic following the phrase is included in at least one implementation of the disclosure, and may be included in more than one implementation. In addition, such phrases do not necessarily refer to the same embodiments or different implementations.

The above detailed description of examples of the disclosure is not intended to be exhaustive or to limit the disclosure to the precise form disclosed above. While specific examples for the disclosure are described above for illustrative purposes, various equivalent modifications are possible within the scope of the disclosure, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The invention claimed is:

1. An audio transmission method, comprising:
    wirelessly connecting an audio receiver device to a first audio streaming device via a first protocol using frequency hopping;
    transmitting a first audio stream from the first audio streaming device using the first protocol to the audio receiver device, wherein the first audio stream has a time-slotted frame structure and wherein at least one audio data packet is transmitted in each frame in at least one audio packet slot; and
    scanning, by the audio receiver device, while receiving the first audio stream from the first audio streaming device, during at least one scan window (S) for frequency hopping synchronization (FHS) packets (F) transmitted from a second audio streaming device in a second audio stream using a second protocol having a time-slotted frame structure and using frequency hopping;
    wherein the scanning activity takes place in manner so as to enable reception of at least one audio packet per frame of the first audio stream by preventing collision of the at least one scan window with at least one audio packet slot (A) per frame (R) of the first audio stream.

2. The method of claim 1, wherein scanning takes place during a scan window (S) whose duration (W_SCAN) and phase is selected such that reception of at least one audio packet per frame from the first audio stream is enabled by preventing collision of the scan window with at least one audio packet slot (A) of the first audio stream, and wherein the scan window starts after the first audio reception slot in a frame (R) if the reception in that slot was successful and terminates at the latest before the start of the last audio reception slot in the next frame.

3. The method of claim 2, wherein the FHS packets (F) are transmitted periodically and wherein the duration (W_SCAN) of the scan window is at least the period length (T_SYNC) of the FHS packet transmission plus the length of the start frame delimiter of the FHS packet.

4. The method of claim 2, wherein each audio packet of the first audio stream is transmitted at least three times per frame (R), and wherein the duration (W_SCAN) of the scan window (S) is selected such that it terminates at the latest before the start of the second audio packet slot (A) in the next frame, so as to enable reception of at least two audio packets in the next frame from the first audio stream.

5. The method of claim 4, wherein the scan window (S) is repeated with a period length (T_SCAN) selected so as to correspond to a maximum acceptable connection latency with regard to detection of the second streaming device.

6. The method of claim 2, wherein the scanning window (S) is repeated periodically so as to, in addition, scan for FHS packets periodically transmitted from a third audio streaming device in a third audio stream using a protocol having a time-slotted frame structure and using frequency hopping, wherein the FHS packet period length (T_SYNC) of the third audio stream is different from the FHS packet period length of the second audio stream, and wherein the period length (T_SCAN) of the scan windows is selected such that a first scan window of a first scan window period and a second scan window of a later second scan window period overlap in part when the first and second scan windows are mapped into the same FHS packet period of the third audio stream by shifting back in time second scan window by an appropriate multiple of the FHS packet period length of the third audio stream.

7. The method of claim 6, wherein said first and second scan window (S) overlap at least by the duration of the start frame delimiter of the FHS packets of the third audio stream.

8. The method of claim 6, wherein there is a set of different FHS packet period lengths (T_SYNC) for the third audio stream, and wherein the period length of the scan windows (S) is selected such that said condition that said first and second scan window overlap in part is fulfilled for each FHS packet period length of the set of FHS packet period lengths.

9. The method of claim 8, wherein the period length (T_SCAN) of the scan windows (S) is a multiple of the audio packet period length (T_AUDIO) of the second audio stream, and wherein the period length of the scan windows is selected such that none of the multiples of the period length of the scan windows is a multiple of any of the FHS packet period lengths (T_SYNC) of the set.

10. The method of claim 1, wherein scanning takes place during periodically repeated scan windows (S) whose duration (W_SCAN) is selected such that reception of at least one audio packet per frame (R) from the first audio stream is enabled by preventing collision of the scan windows with at least one audio packet slot of the first audio stream, wherein the FHS packets of the second audio stream are transmitted periodically, and wherein the period length (T_SCAN) of the scan windows is selected such that a first scan window of a first scan window period and a second scan window a later second scan window period overlap in part when the first and second scan window are mapped into the same FHS packet period by shifting back in time the second scan window by an appropriate multiple of the FHS packet period length.

11. The method of claim 10, wherein the scan window period length (T_SCAN) is longer than the FHS packet period length (T_SYNC) and is different from any multiple of the FHS packet period length.

12. The method of claim 10, wherein the first scan window and second scan window overlap at least by the duration of the start frame delimiter of the FHS packets (F).

13. The method of claim 10, wherein each scan window period contains a single scan window (S).

14. The method of claim 10, wherein each audio packet (A) of the first audio stream is transmitted at least twice per frame (R), and wherein the duration (W_SCAN) of the scan windows (S) is selected such that reception of at least one audio packet per frame from the first audio stream is enabled.

15. The method of claim 14, wherein each audio packet (A) of the first audio stream is transmitted at least three times per frame (R), and wherein the duration (W_SCAN) of the 16. An audio receiver device configured to
wirelessly connect to a first audio streaming device via a first protocol using frequency hopping;
receive a first audio stream transmitted from the first audio streaming device using the first protocol, wherein the first audio stream has a time-slotted frame structure and wherein at least one audio data packet is transmitted in each frame (R); and
scan, while receiving the first audio stream from the first audio streaming device, during at least one scan window (S) for frequency hopping synchronization (FHS) packets transmitted from a second audio streaming device in a second audio stream using a second protocol having a time-slotted frame structure and using frequency hopping;
wherein the audio receiver device is further configured to enable reception of at least one audio packet per frame from the first audio stream by preventing collision of the at least one scan window with at least one audio packet slot per frame of the first audio stream.

17. The audio receiver device of claim 16, wherein the audio receiver device is a hearing aid, an auditory prosthesis device, a headset or a headphone.

18. A hearing assistance system comprising:
an audio receiver device
a first audio streaming device;
a second audio streaming device;
an audio receiver device configured to
wirelessly connect to the first audio streaming device via a first protocol using frequency hopping;
receive a first audio stream transmitted from the first audio streaming device using the first protocol, wherein the first audio stream has a time-slotted frame structure and wherein at least one audio data packet is transmitted in each frame (R); and
scan, while receiving the first audio stream from the first audio streaming device, during at least one scan window (S) for frequency hopping synchronization (FHS) packets transmitted from the second audio streaming device in a second audio stream using a second protocol having a time-slotted frame structure and using frequency hopping;
wherein the audio receiver device is further configured to enable reception of at least one audio packet per frame from the first audio stream by preventing collision of the at least one scan window with at least one audio packet slot per frame of the first audio stream.

19. The system of claim 18, wherein the first audio streaming device is a hearing aid, a wireless microphone, a phone device, a tablet computer, a media player or a TV set.

20. The system of claim 18, wherein the second audio streaming device is a hearing aid, a wireless microphone, a phone device, a tablet computer, a media player or a TV set.

* * * * *